US011168793B2

(12) United States Patent
Tanishima et al.

(10) Patent No.: US 11,168,793 B2
(45) Date of Patent: Nov. 9, 2021

(54) SLIDING COMPONENT

(71) Applicant: EAGLE INDUSTRY CO., LTD., Tokyo (JP)

(72) Inventors: Ayano Tanishima, Tokyo (JP); Tadatsugu Imura, Tokyo (JP); Hideyuki Inoue, Tokyo (JP); Yuichiro Tokunaga, Tokyo (JP); Takeshi Hosoe, Tokyo (JP); Yuta Negishi, Tokyo (JP); Yuki Maetani, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 95 days.

(21) Appl. No.: 16/607,322

(22) PCT Filed: May 12, 2018

(86) PCT No.: PCT/JP2018/018438
§ 371 (c)(1),
(2) Date: Oct. 22, 2019

(87) PCT Pub. No.: WO2018/212108
PCT Pub. Date: Nov. 22, 2018

(65) Prior Publication Data
US 2020/0378501 A1 Dec. 3, 2020

(30) Foreign Application Priority Data

May 19, 2017 (JP) .............................. JP2017-099486

(51) Int. Cl.
F16J 15/34 (2006.01)
F16C 33/74 (2006.01)
(Continued)

(52) U.S. Cl.
CPC ........... *F16J 15/3404* (2013.01); *F16C 33/10* (2013.01); *F16J 15/40* (2013.01)

(58) Field of Classification Search
CPC ...... F16J 15/34; F16J 15/3404; F16J 15/3408; F16J 15/3424; F16J 15/40; F16C 33/10
See application file for complete search history.

(56) References Cited

U.S. PATENT DOCUMENTS 5,092,612 A 3/1992 Victor et al.
6,902,168 B2 * 6/2005 Tejima ................. F16J 15/3424
277/399

(Continued)

FOREIGN PATENT DOCUMENTS

JP S61168566 A 7/1986
JP S63190975 A 8/1988

(Continued)

OTHER PUBLICATIONS

International Search Report (ISR) dated Aug. 14, 2018, issued for International application No. PCT/JP2018/018438. (1 page).

Primary Examiner — Gilbert Y Lee
(74) Attorney, Agent, or Firm — Law Office of Katsuhiro Arai

(57) ABSTRACT

In an exemplary embodiment, a pair of sliding components has sliding surfaces that slide with respect to each other, wherein at least the sliding surface S on one side includes a random dimple group 11 in which plural dimples 10 are randomly arranged, and at least one land portion 15 that partitions radial portions 11a, 11b of the random dimple group 11. According to the configurations, a lubricating effect and a sealing effect can be improved.

16 Claims, 6 Drawing Sheets

(51) Int. Cl.
*F16C 33/10* (2006.01)
*F16J 15/40* (2006.01)

(56) References Cited

U.S. PATENT DOCUMENTS

| | | | | |
|---|---|---|---|---|
| 7,052,016 | B2* | 5/2006 | Tejima | F16J 15/3404 |
| | | | | 277/399 |
| 7,500,676 | B2* | 3/2009 | Tejima | F16J 15/3424 |
| | | | | 277/399 |
| 2016/0033045 | A1 | 2/2016 | Itadani et al. | |
| 2016/0195139 | A1 | 7/2016 | Inoue et al. | |

FOREIGN PATENT DOCUMENTS

| | | | |
|---|---|---|---|
| JP | 2001221179 | A | 8/2001 |
| JP | 2003343741 | A | 12/2003 |
| WO | 2014174725 | A1 | 10/2014 |
| WO | 2015041048 | A1 | 3/2015 |

\* cited by examiner

SLIDING COMPONENT

CROSS-REFERENCE TO RELATED APPLICATIONS

This application is the U.S. National Phase under 35 U.S.C. § 371 of International Application PCT/JP2018/018438, filed May 12, 2018, which claims priority to Japanese Patent Application No. JP2017-099486, filed May 19, 2017. The International Application was published under PCT Article 21(2) in a language other than English.

TECHNICAL FIELD

The present invention relates to a sliding component suitable, for example, as a mechanical seal, a sliding bearing, and other sliding units. In particular, the present invention relates to a sliding component such as a sealing ring or a bearing that requires reduction of friction by interposing a fluid between sliding surfaces, and prevention of leakage of the fluid from the sliding surfaces.

BACKGROUND ART

In a mechanical seal serving as an example of a sliding component, while maintaining a sealing property, sliding friction during rotation is required to be reduced to the extreme. By variously texturing the sliding surfaces, a method of reducing friction is realized. For example, as one of texturing, arrangement of dimples on the sliding surfaces is known.

Conventionally, in a case where dimples are provided on a sliding surface, plural dimples are arranged and aligned in order in general. For example, in the invention described in JP 2003-343741 A (hereinafter, referred to as "Patent Document 1"), for the purpose of reducing a friction coefficient of a sliding surface and improving a sealing ability, plural thin and long dimples are provided and aligned in order in a regular manner on the sliding surface so that the inclination directions of the dimples are different between the outer peripheral side and the inner peripheral side with a border reference line X as a borderline. Leading ends in the rotation direction of the dimples on the outer peripheral side are inclined toward the outer peripheral side, and leading ends in the rotation direction of the dimples on the inner peripheral side are inclined toward the inner peripheral side.

Conventionally, in order to improve a lubricating property, random arrangement of plural dimples is also known. For example, in the invention described in JP 2001-221179 A (hereinafter, referred to as "Patent Document 2"), plural dimples are randomly arranged on an inner wall of a cylinder of a rotary compressor and a leading end surface and both side end surfaces of a sliding vane.

CITATION LIST

Patent Documents

Patent Document 1: JP 2003-343741 A
Patent Document 2: JP 2001-221179 A

SUMMARY OF THE INVENTION

Technical Problem

However, in the invention described in Patent Document 1, since the dimples are arranged and aligned in order, an effect of suctioning from the leakage side to the sliding surface and an effect of flowing from the sealed fluid side to the sliding surface are low. Thus, there is a need for a complicated configuration in which the leading ends in the rotation direction of the dimples on the outer peripheral side are inclined toward the outer peripheral side and the leading ends in the rotation direction of the dimples on the inner peripheral side are inclined toward the inner peripheral side. Since a fluid concentrates on a radially center portion of the sliding surface, there is also a problem that the entire sliding surface cannot be uniformly lubricated.

The invention described in Patent Document 2 is just to randomly arrange the plural dimples in order to improve the lubricating property, and a performance of random dimples is not sufficiently obtained.

An object of the present invention is to provide sliding components with which a performance of a random dimple group in which plural dimples are randomly arranged is sufficiently obtained and a lubricating performance and a sealing performance are improved.

Solution to Problem

To attain the above object, sliding components according to a first aspect of the present invention are a pair of sliding components having sliding surfaces that slide with respect to each other, characterized in that at least the sliding surface on one side includes a random dimple group in which plural dimples are randomly arranged, and at least one land portion that partitions radial portions of the random dimple group.

According to the first aspect, circumferential movement of a fluid flowing into the sliding surface is blocked by the land portion and positive pressure is generated. Thus, a fluid lubricating effect and a sealing effect of the random dimple group are synergistically increased, and it is possible to provide the sliding components excellent in a sealing property and a lubricating property. The fluid lubricating effect is an effect of letting the fluid flowing from the sealed fluid side to the sliding surface and improving the lubricating property. The sealing effect is also called as a pumping effect of suctioning the fluid from the leakage side to the sliding surface and improving the sealing property.

The sliding components according to a second aspect of the present invention are characterized in that the radial portions of the random dimple group are inclined with respect to the radial axis.

According to the second aspect, by inclining the radial portions of the random dimple group with respect to the radial axis, it is possible to change influence degrees of the fluid lubricating effect and the sealing effect.

The sliding components according to a third aspect of the present invention are characterized in that the pair of radial portions of the random dimple group is inclined to open toward the radially inside.

According the third aspect, the inner diameter side of the random dimple group is formed to be large. Thus, it is possible to take more fluid from the leakage side into the sliding surface and enhance the sealing effect.

The sliding components according to a fourth aspect of the present invention are characterized in that the pair of radial portions of the random dimple group is inclined to open toward the radially outside.

According to the fourth aspect, the outer diameter side of the random dimple group is formed to be large. Thus, it is possible to take more fluid from the sealed fluid side into the sliding surface and enhance the fluid lubricating effect.

The sliding components according to a fifth aspect of the present invention are characterized in that the shape of the random dimple group is different from the shape of other random dimple groups adjacent to the random dimple group.

According to the fifth aspect, by combining and arranging the random dimple groups having different sealing effects and fluid lubricating effects, it is possible to adapt to various sliding speeds and temperatures (fluid viscosity).

The sliding components according to a sixth aspect of the present invention are characterized in that the pair of radial portions of the random dimple group is inclined to open toward the radially outside, and a pair of radial portions of the random dimple group adjacent to the random dimple group is inclined to open toward the radially inside.

According to the sixth aspect, by combining and arranging the random dimples excellent in a sealing performance and the random dimples excellent in a lubricating performance, it is possible to adapt to various sliding speeds and temperatures (fluid viscosity).

DESCRIPTION OF EMBODIMENTS

Hereinafter, with reference to the drawings, modes for carrying out the present invention will be described as examples based on embodiments. However, the dimensions, the materials, the shapes, the relative arrangements, etc. of constituent components described in the embodiments are not intended to limit the scope of the present invention only to them unless otherwise described explicitly.

First Embodiment

With reference to FIGS. 1 to 4, sliding components according to a first embodiment of the present invention will be described.

In the following embodiment, as an example, a mechanical seal that is an example of the sliding components will be described. However, the present invention is not limited to this but for example can also be utilized as a sliding component of a bearing that slide with a rotating shaft while sealing lubricating oil on the axially one side of a cylindrical sliding surface.

The outer peripheral side of the sliding component forming the mechanical seal will be described as the high pressure fluid side (sealed fluid side), and the inner peripheral side as the low pressure fluid side (leakage side).

Figure 1:
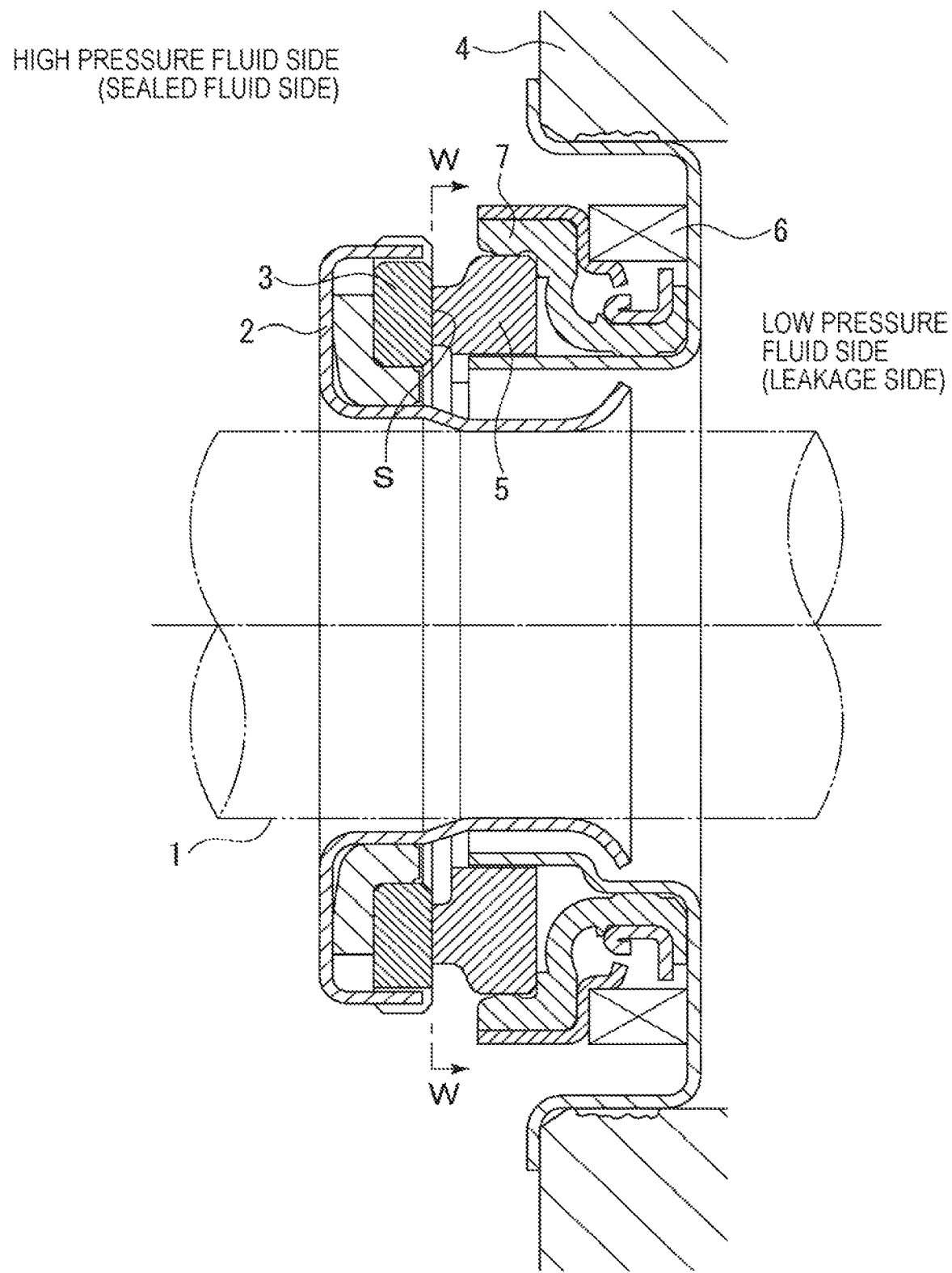
FIG. 1 is a vertically sectional view showing an example of a mechanical seal according to a first embodiment of the present invention.

FIG. 1 is a vertically sectional view showing an example of the mechanical seal, which is an inside mechanical seal in the form of sealing a sealed fluid on the high pressure fluid side to leak from the outer periphery of sliding surfaces side toward the inner periphery. The mechanical seal is provided with an annular rotating side sealing ring 3 serving as one sliding component provided across a sleeve 2 on the side of a rotating shaft 1 that drives a pump impeller (not shown) on the high pressure fluid side in a state where the rotating side sealing ring 3 is rotatable integrally with this rotating shaft 1, and an annular stationary side sealing ring 5 serving as the other sliding component provided in a housing 4 of a pump in a non-rotating state and an axially movable state. With a coiled wave spring 6 and a bellows 7 axially biasing the stationary side sealing ring 5, the sealing rings slide in close contact with each other at sliding surfaces S. That is, this mechanical seal prevents an outflow of the sealed fluid from the outer peripheral side of the rotating shaft 1 to the inner peripheral side at the sliding surfaces S of the rotating side sealing ring 3 and the stationary side sealing ring 5.

FIG. 1 shows a case where width of the sliding surface of the rotating side sealing ring 3 is greater than width of the sliding surface of the stationary side sealing ring 5. However, the present invention is not limited to this but is also applicable to the opposite case as a matter of course. Rotation centers of the rotating shaft 1, the rotating side sealing ring 3, and the stationary side sealing ring 5 substantially match with each other.

The material of the rotating side sealing ring 3 and the stationary side sealing ring 5 is selected from silicon carbide (SiC) excellent in wear resistance, carbon excellent in self-lubricity, etc. For example, both the sealing rings can be made of SiC or the rotating side sealing ring 3 of SiC and the stationary side sealing ring 5 of carbon can be combined.

Dimples are arranged on at least any one of the sliding surfaces of the rotating side sealing ring 3 and the stationary side sealing ring 5 that slide with respect to each other.

In the present invention, the "dimples" are dents formed on the flat sliding surface S, and the shape thereof is not particularly limited. For example, the planar shape of the dents includes a circle, a triangle, an ellipse, an oval, or a rectangle. The sectional shape of the dents also includes various shapes such as a bowl shape or a square.

In the present example, a case where plural dimples are randomly arranged on the sliding surface S of the stationary side sealing ring 5 will be described. In this case, dimples may be provided or not provided in the rotating side sealing ring 3. Random arrangement indicates arrangement excluding aligned arrangement in which dimples are arranged on a regular basis, and does not include zig-zag arrangement.

By randomly arranging dimple groups on the sliding surface, it is possible to improve contradictory functions of lubricating and sealing. A mechanism to improve the lubricating function and the sealing function is as follows.

When the opposing sliding surface is relatively moved, the fluid is suctioned into hole portions of the dimples formed on the sliding surface by viscosity of the fluid, and negative pressure is generated in a part on the upstream side of the hole portions, and positive pressure is generated in a part on the downstream side by the wedge effect. At that time, in the negative pressure part on the upstream side of the hole portions, a liquid film is broken and a cavity is formed due to steam and bubbles of a liquid (cavitation), so that negative pressure is cancelled. As a result, only positive pressure remains and a load capacity is generated, and hence the sliding surface S is brought up. When the sliding surface S is brought up, a gap between the two sliding surfaces that slide with respect to each other is increased, and the fluid having a lubricating property flows into the sliding surfaces S, so that the lubricating function is obtained.

The pressure of the fluid suctioned into the dimples is boosted in the dimples and the fluid is discharged from the dimples. That is, the suction of the fluid into the dimples and the discharge of the fluid whose pressure is boosted from the dimples are consecutively performed. When the plural dimples are randomly arranged, the fluid suctioned into and discharged from the dimples arranged on the inner peripheral side of the sliding surface is consecutively and repeatedly suctioned into and discharged from the dimples arranged on the further outer diameter side. Thus, the sealing function in which the fluid is gradually delivered from the inner diameter side to the outer diameter side is obtained.

Figure 2:
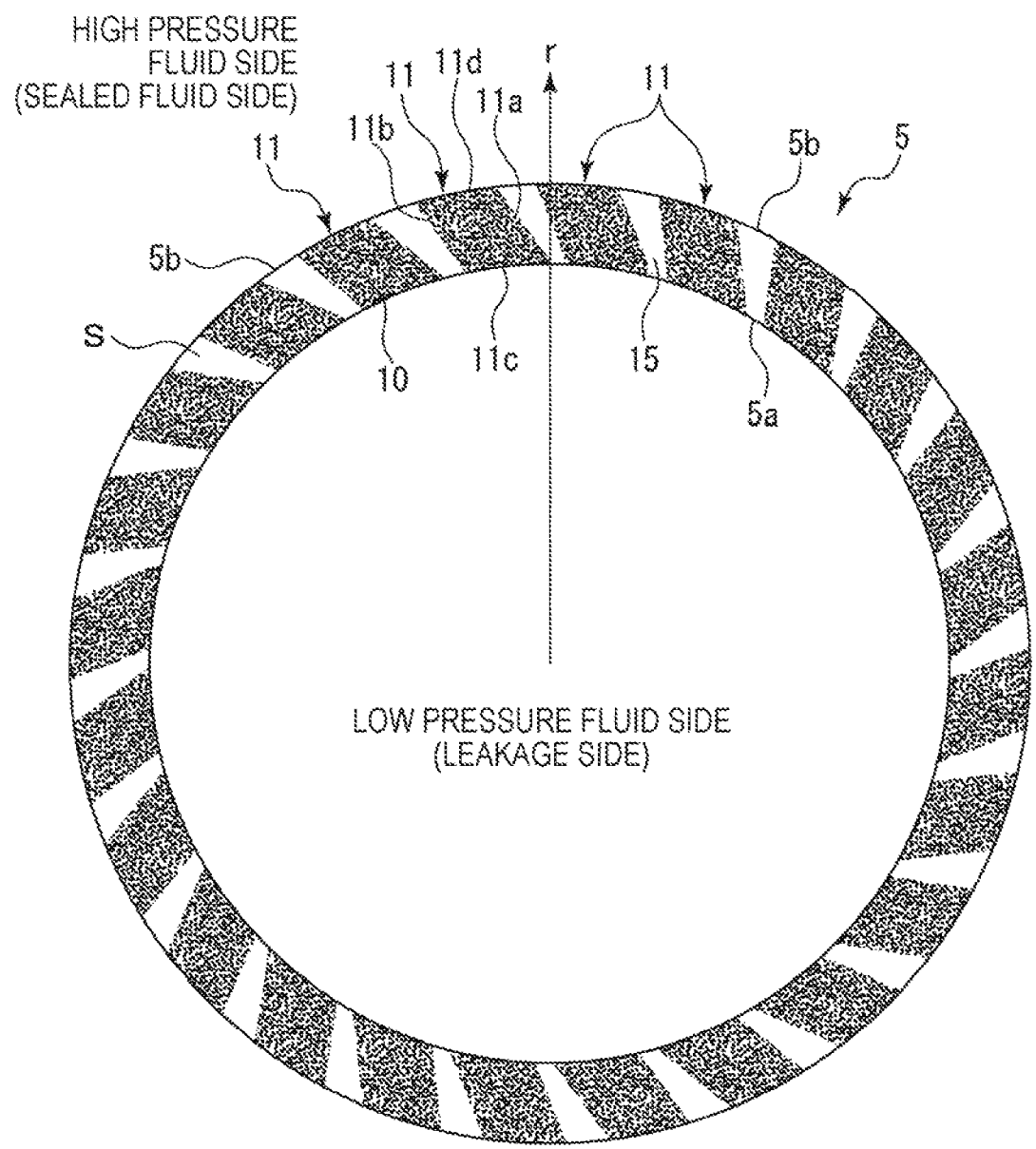
FIG. 2 is a W-W arrow view of FIG. 1, showing an example of a sliding surface of a sliding component according to the first embodiment of the present invention.

In FIG. 2, plural (twenty-four in FIG. 2) random dimple groups 11 are arranged on the sliding surface S of the stationary side sealing ring 5 at equal intervals. In each of the random dimple groups 11, plural dimples 10 are randomly arranged over the entire length from an inner peripheral portion 5a (leakage side) to an outer peripheral portion 5b (sealed fluid side) of the sliding surface S. Radial portions 11a, 11b of the random dimple group 11 are partitioned by land portions 15 extending in the radial direction. The random dimple groups 11 are formed to have the substantially same width as each other from the inner peripheral portion 5a (leakage side) to the outer peripheral portion 5b (sealed fluid side) of the sliding surface S. An inside circumferential portion 11c where the random dimple group is in contact with the leakage side is partitioned by the inner peripheral portion 5a of the sliding surface S. An outside circumferential portion 11d where the random dimple group is in contact with the sealed fluid side is partitioned by the outer peripheral portion 5b of the sliding surface S. The inside circumferential portion 11c and the outside circumferential portion 11d are formed to have the substantially same width as each other.

Each of the land portions 15 is a flat surface having narrower circumferential width than circumferential width of the random dimple group 11 over the entire length from the inner peripheral portion 5a (leakage side) to the outer peripheral portion 5b (sealed fluid side) of the sliding surface S. By the land portion 15, the random dimple group 11 is separated from other adjacent random dimple groups 11. The land portion 15 and the radial portions 11a, 11b of the random dimple group 11 are inclined with respect to the radial axis r passing through the rotation center.

By separating the adjacent random dimple groups 11 by the land portion 15, circumferential movement of the fluid flowing into the sliding surface S is blocked, and a dynamic pressure generation effect of generating positive pressure is obtained. The gap between the two sliding surfaces that slide with respect to each other is increased and the fluid having the lubricating property flows into the sliding surfaces S, so that a fluid lubricating operation is obtained.

Further, the radial portions 11a, 11b of the random dimple group 11 have inclination with respect to the radial axis r. Thereby, in comparison to a case where the radial portions do not have the inclination, it is possible to furthermore enhance a sealing effect. For example, in FIG. 2, in a case where the rotating side sealing ring 3 is rotated anti-clockwise with respect to the stationary side sealing ring 5, by inclining the random dimple group 11 anti-clockwise, that is, to the receding side in the rotation direction, the fluid from the leakage side to the random dimple group 11 is efficiently taken in, and a sealing performance is improved.

Figure 3:
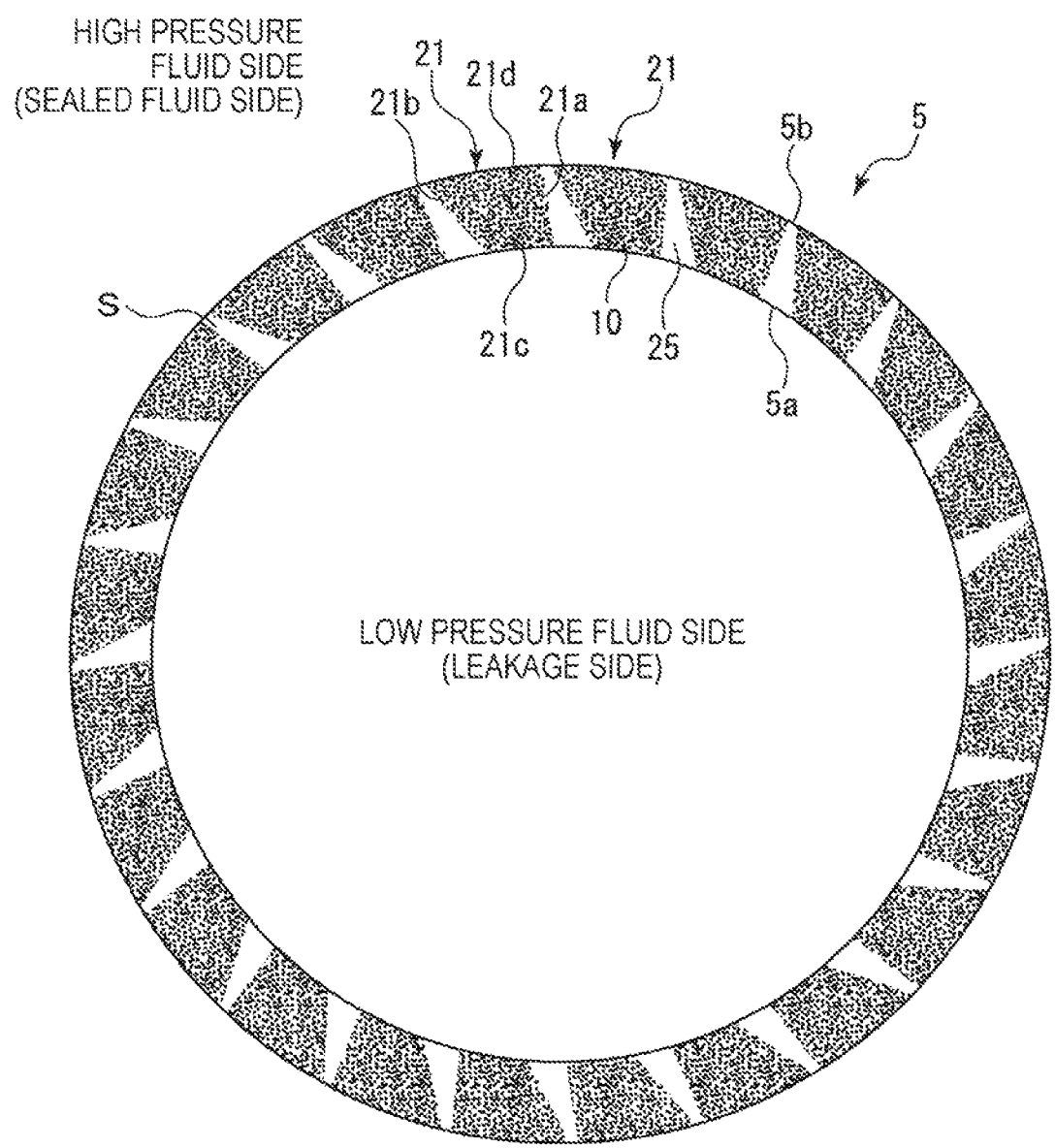
FIG. 3 is a W-W arrow view of FIG. 1, showing a modified example of the sliding surface of the sliding component according to the first embodiment of the present invention.

FIG. 3 is modification of FIG. 2, and a pair of radial portions 21a, 21b of a random dimple group 21 is inclined to open toward the radially outside. Thereby, circumferential width of an outside circumferential portion 21d of the random dimple group 21 is increased more than circumferential width of an inside circumferential portion 21c, and a flow of the fluid from the sealed fluid side to the random dimple group 21 is increased, so that it is possible to improve a lubricating effect. That is, in the random dimple group 21, by changing inclination of the pair of radial portions 21a, 21b, it is possible to improve a fluid lubricating performance more than the random dimple group 11 of FIG. 2.

Figure 4:
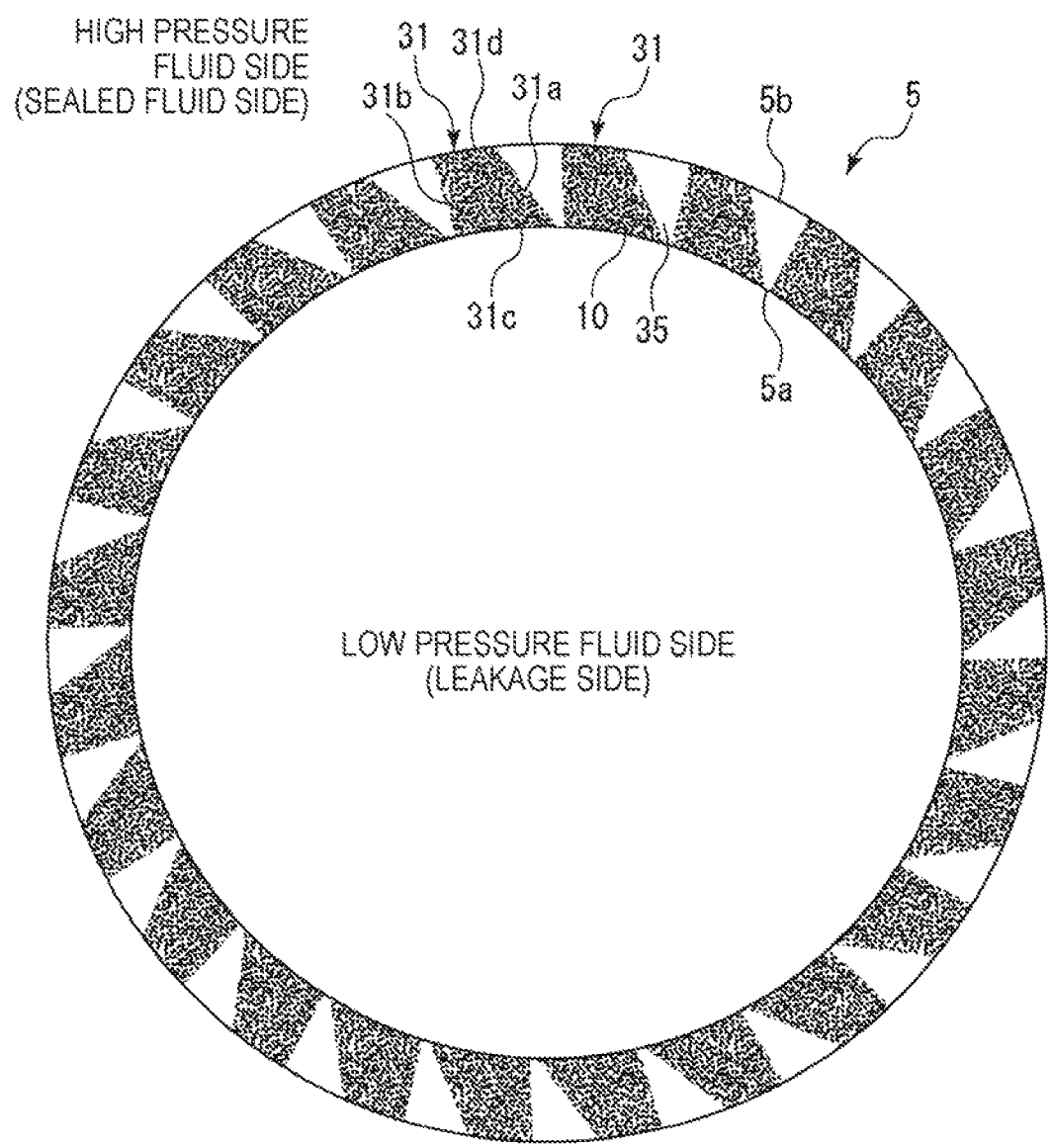
FIG. 4 is a W-W arrow view of FIG. 1, showing another modified example of the sliding surface of the sliding component according to the first embodiment of the present invention.

FIG. 4 is further modification of FIG. 2, and a pair of radial portions 31a, 31b of a random dimple group 31 is inclined to open toward the radially inside. Thereby, circumferential width of an inside circumferential portion 31c of the random dimple group 31 is increased more than circumferential width of an outside circumferential portion 31d, and a flow of the fluid from the leakage side to the random dimple group 31 is increased, so that it is possible to furthermore improve the sealing effect.

The following specific effects are exerted in the sliding components of the first embodiment.

The random dimple groups 11, 21, 31 formed on the sliding surface S can improve the contradictory functions of lubricating and sealing.

By separating and partitioning the random dimple groups 11 by the land portions 15, the circumferential movement of the fluid flowing into the sliding surface S is blocked and by the dynamic pressure generation effect of generating positive pressure, it is possible to furthermore improve a fluid lubricating effect. The same effect is exerted in the random dimple groups 21, 31.

By changing inclination magnitude or a mode of inclination of the radial portions 11a, 11b of the random dimple group 11, it is possible to enhance the sealing effect or to enhance the fluid lubricating effect. Thereby, by adjusting the inclination magnitude or the mode of inclination of the radial portions 11a, 11b of the random dimple group 11 according to sliding speed or a temperature (fluid viscosity), it is possible to provide the sliding components that adapt to various conditions. The same effect is exerted in the random dimple groups 21, 31.

In the example of FIG. 2, the random dimple group 11 has the same shape as other adjacent random dimple groups. However, the present invention is not limited to this but the random dimple group 11 may have a different shape from other adjacent random dimple groups. For example, by combining and arranging random dimple groups having different shapes from the shape of the random dimple group 11 according to sliding speed or a temperature (fluid viscosity), it is possible to adapt to various conditions. Regarding the random dimple groups 21, 31 of the examples of FIGS. 3, 4, it is possible to adapt to various conditions by combining and arranging random dimple groups having different shapes.

In the example of FIG. 2, the twenty-four random dimple groups 11 are arranged on the sliding surface S at equal intervals. However, the present invention is not limited to twenty-four and equal intervals but one random dimple group and one land portion may be arranged, or 2, 3, ..., 36 or more random dimple groups and 2, 3, ..., 36 or more land portions may be arranged. The same applies to the random dimple groups 21, 31 of the examples of FIGS. 3, 4.

In the example of FIG. 2, the plural random dimple groups 11 are formed in a band shape extending in the radial direction, respectively having equal center angles at the radially same positions. The plural land portions 15 are formed in flat surfaces extending in the radial direction, respectively having equal center angles at the radially same positions. However, the present invention is not limited to this but at the radially same positions, random dimple groups having different center angles may be combined with land portions having different center angles. Alternatively, at the radially same positions, random dimple groups having equal center angles may be combined with land portions having different center angles. Further, at the radially same positions, plural random dimple groups having different center angles may be combined with land portions having equal center angles. The same applies to the random dimple groups 21, 31 of the examples of FIGS. 3, 4.

Second Embodiment

Sliding components according to a second embodiment will be described with reference to FIGS. 5 and 6. The sliding components according to the second embodiment are different in a point that at least one set of adjacent random dimple groups has different shapes from each other, and the other basic configurations are the same as the first embodiment. The same members will be given the same reference signs and duplicated description will be omitted.

Figure 5:
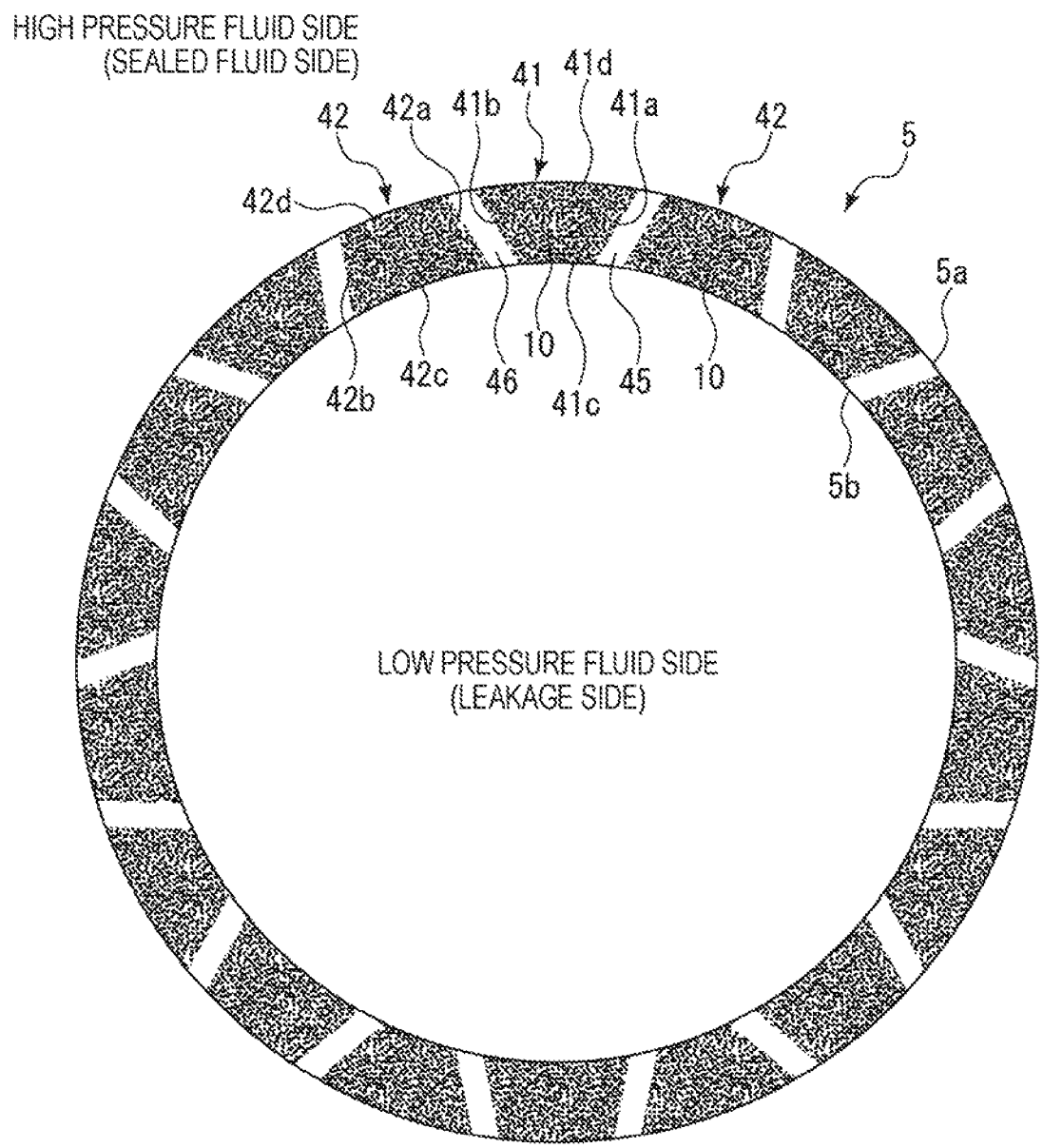
FIG. 5 is a W-W arrow view of FIG. 1, showing a sliding surface of a sliding component according to a second embodiment of the present invention.

As shown in FIG. 5, shapes of adjacent random dimple groups 41, 42 are different from each other. A pair of radial portions 41a, 41b of the random dimple group 41 is inclined to open toward the radially outside. Thereby, circumferential width of an outside circumferential portion 41d of the random dimple group 41 is increased more than circumferential width of an inside circumferential portion 41c, and a flow of a fluid from the sealed fluid side to the random dimple group 41 is increased, so that it is possible to further improve the lubricating effect. Meanwhile, a pair of radial portions 42a, 42b of the random dimple group 42 adjacent to the random dimple group 41 is inclined to open toward the radially inside. Thereby, circumferential width of an inside circumferential portion 42c of the random dimple group 42 is increased more than circumferential width of an outside circumferential portion 42d, and a flow of the fluid from the leakage side to the random dimple group 42 is increased, so that it is possible to further improve the sealing effect. In such a way, by alternately arranging the random dimple group 41 with which the fluid lubricating effect is improved and the random dimple group 42 with which the sealing effect is enhanced, it is possible to provide the sliding components with which contradictory performances are improved.

Further, the random dimple groups 41, 42 are formed symmetrically in the left and right direction. Thereby, even when the sliding component is rotated in any directions, it is possible to exert the same sealing effect and the same fluid lubricating effect.

Figure 6:
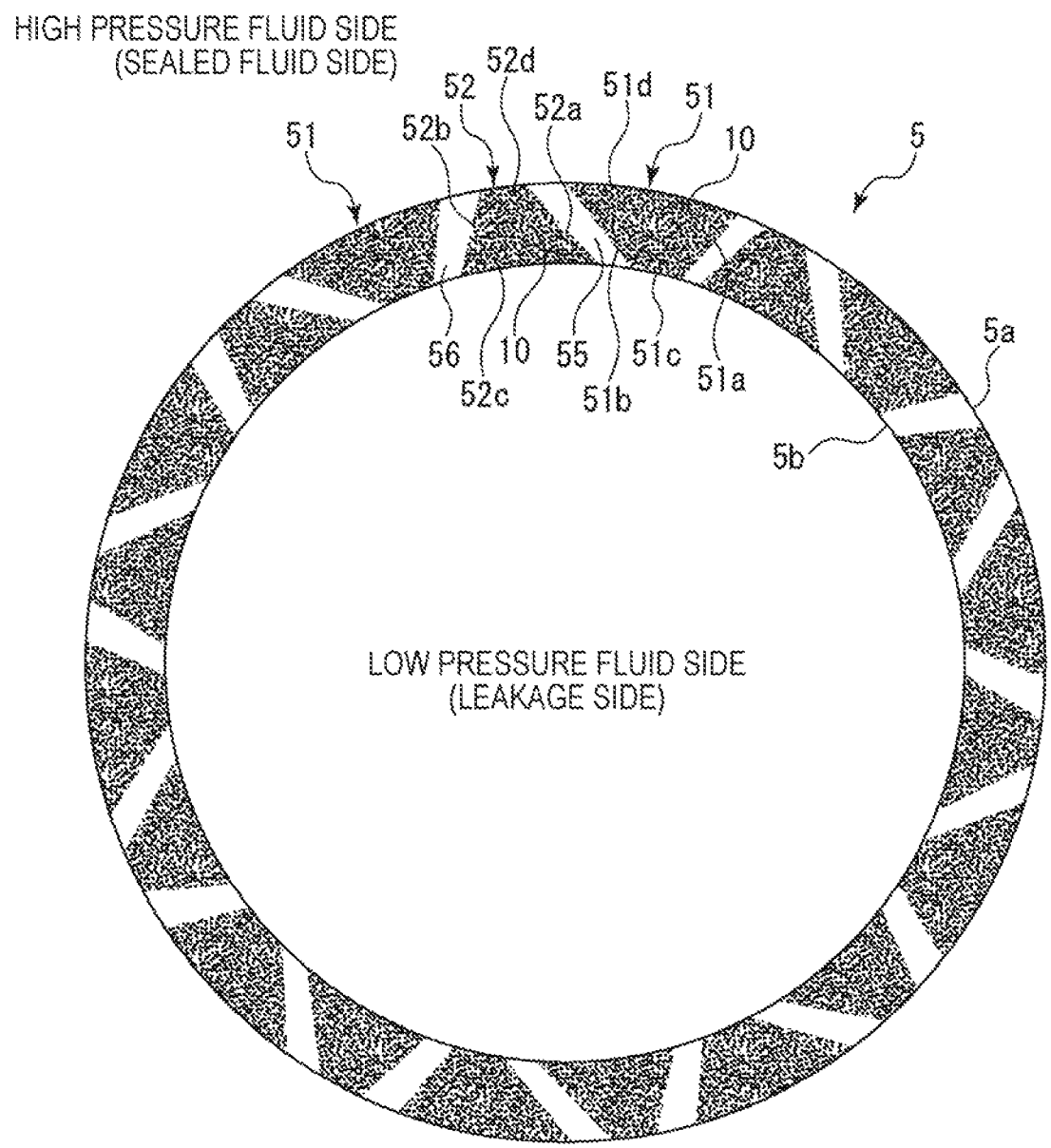
FIG. 6 is a W-W arrow view of FIG. 1, showing a modified example of the sliding surface of the sliding component according to the second embodiment of the present invention.

FIG. 6 is a modified example of FIG. 5, and is different from FIG. 5 in a point that adjacent random dimple groups 51, 52 are formed asymmetrically in the left and right direction. Thereby, rotation of the sliding component can be efficiently utilized. Thus, it is possible to further enhance the sealing effect and the fluid lubricating performance of the random dimple groups 51, 52 of FIG. 6 in comparison to the random dimple groups 41, 42 of FIG. 5. For example, in a case where the rotating side sealing ring 3 is rotated anti-clockwise with respect to the stationary side sealing ring 5, by inclining a radial portion 51b of the random dimple group 51 anti-clockwise, that is, further to the receding side in the rotation direction, a flow of the fluid from the sealed fluid side to the random dimple group 51 is increased, so that it is possible to enhance the fluid lubricating effect. By also inclining a radial portion 52a of the random dimple group 52 further to the receding side in the rotation direction, a flow of the fluid from the leakage side to the random dimple group 52 is increased, so that it is possible to enhance the fluid lubricating effect.

The sliding components of the second embodiment exert the following specific effects.

By alternately arranging the random dimple groups 41, 51 with which the fluid lubricating effect is improved and the random dimple groups 42, 52 with which the sealing effect is enhanced, it is possible to provide the sliding components with which contradictory performances are improved.

By respectively independently changing inclination magnitude or a mode of inclination of the radial portions 51a, 51b, 52a, 52b of the random dimple groups 51, 52, it is possible to independently adjust the sealing effect or the fluid lubricating effect of each of the random dimple groups 51, 52. Thereby, by adjusting the sealing effect or the fluid lubricating effect according to sliding speed or a temperature (fluid viscosity) and alternately arranging the random dimple groups 51 and the random dimple groups 52 having different characteristics from each other, it is possible to provide the sliding components that adapt to various sliding speeds or temperatures (fluid viscosity).

In the example of FIG. 5, the nine random dimple groups 41, the nine random dimple groups 42, and the eighteen land portions are arranged on the sliding surface S. However, the present invention is not limited to this but one random dimple group 41, one random dimple group 42, and two land portions may be arranged to form a sliding component. Further, 2, 3, . . . , 36 or more random dimple groups 41, 2, 3, . . . , 36 or more random dimple groups 42, and 4, 6, . . . , 72 or more land portions may be arranged. The same also applies to the random dimple groups 21, 31 of the examples of FIGS. 3, 4.

In the example of FIG. 5, the plural random dimple groups 41, 42 formed on the sliding surface S are formed in a band shape respectively having equal center angles at the radially same positions. The plural land portions 15 are formed in flat surfaces respectively having equal center angles at the radially same positions. However, the present invention is not limited to this but at the radially same positions, different random dimple groups may be combined with land portions having different center angles. Alternatively, at the radially same positions, random dimple groups having equal center angles may be combined with land portions having different center angles. Further, random dimple groups having different center angles may be combined with land portions having equal center angles. The same applies to the example of FIG. 6.

In the first and second embodiments, the examples in which the sliding component is used for at least any one of the pair of the rotating sealing ring and the stationary sealing ring in the mechanical seal device is described. However, the sliding component can also be utilized as a sliding component of a bearing to slide with a rotating shaft while sealing lubricating oil on the axially one side of a cylindrical sliding surface.

In the first and second embodiments, the outer peripheral side of the sliding component is described as the high pressure fluid side (sealed fluid side), and the inner peripheral side as the low pressure fluid side (leakage side).

However, the present invention is not limited to this but can be applied to a case where the outer peripheral side of the sliding component is the low pressure fluid side (leakage side) and the inner peripheral side is the high pressure fluid side (sealed fluid side).

REFERENCE SIGNS LIST 1 rotating shaft
2 sleeve
3 rotating side sealing ring
4 housing
5 stationary side sealing ring
5a inner peripheral portion
5b outer peripheral portion
6 coiled wave spring
7 bellows
10 dimple
11 random dimple group
11a radial portion
11b radial portion
15 land portion
21 random dimple group
21a radial portion
21b radial portion
25 land portion
31 random dimple group
31a radial portion
31b radial portion
35 land portion
41 random dimple group
41a radial portion
41b radial portion
45 land portion
51 random dimple group
51a radial portion
51b radial portion
55 land portion
52 random dimple group
52a radial portion
52b radial portion
56 land portion
S sliding surface
r radial axis

The invention claimed is:

1. A pair of sliding components having sliding surfaces that slide with respect to each other, characterized in that at least the sliding surface on one side includes multiple random dimple groups, wherein
each random dimple group extends over an entire length from an inner circumference to an outer circumference of the sliding surface, and is constituted by plural dimples which are randomly arranged therein, wherein each dimple have a shape of a circle, ellipse, or oval as viewed in an axial direction of the sliding surface, and
the multiple random dimple groups are separated from each other by a land portion that extends over an entire length from the inner circumference to the outer circumference of the sliding surface and radially partitions adjacent random dimple groups.

2. The sliding components according to claim 1, characterized in that radial peripheries of each random dimple group are inclined with respect to a radial axis.

3. The sliding components according to claim 2, characterized in that the shape of each random dimple group is different from the shape of another random dimple group adjacent to the random dimple group.

4. The sliding components according to claim 3, characterized in that a pair of radial peripheries of each random dimple group is inclined to be wider toward the radially inside.

5. The sliding components according to claim 3, characterized in that a pair of radial peripheries of each random dimple group is inclined to be wider toward the radially outside.

6. The sliding components according to claim 3, characterized in that a pair of radial peripheries of each random dimple group is inclined to be wider toward the radially outside, and a pair of radial portions of another random dimple group adjacent to the random dimple group is inclined to be wider toward the radially inside.

7. The sliding components according to claim 2, characterized in that a pair of radial peripheries of each random dimple group is inclined to be wider toward the radially inside.

8. The sliding components according to claim 2, characterized in that a pair of radial peripheries of each random dimple group is inclined to be wider toward the radially outside.

9. The sliding components according to claim 2, characterized in that a pair of radial peripheries of each random dimple group is inclined to be wider toward the radially outside, and a pair of radial portions of another random dimple group adjacent to the random dimple group is inclined to be wider toward the radially inside.

10. The sliding components according to claim 1, characterized in that the shape of each random dimple group is different from the shape of another random dimple group adjacent to the random dimple group.

11. The sliding components according to claim 10, characterized in that a pair of radial peripheries of each random dimple group is inclined to be wider toward the radially inside.

12. The sliding components according to claim 10, characterized in that a pair of radial peripheries of each random dimple group is inclined to be wider toward the radially outside.

13. The sliding components according to claim 10, characterized in that a pair of radial peripheries of each random dimple group is inclined to be wider toward the radially outside, and a pair of radial portions of another random dimple group adjacent to the random dimple group is inclined to be wider toward the radially inside.

14. The sliding components according to claim 1, characterized in that a pair of radial peripheries of each random dimple group is inclined to be wider toward the radially inside.

15. The sliding components according to claim 1, characterized in that a pair of radial peripheries of each random dimple group is inclined to be wider toward the radially outside.

16. The sliding components according to claim 1, characterized in that a pair of radial peripheries of each random dimple group is inclined to be wider toward the radially outside, and a pair of radial portions of another random dimple group adjacent to the random dimple group is inclined to be wider toward the radially inside.

* * * * *